US012801084B2

(12) United States Patent
Hong et al.

(10) Patent No.: US 12,801,084 B2
(45) Date of Patent: Nov. 17, 2026

(54) METHOD FOR PROVIDING OPTIMIZED HOLOGRAMS BY EXTRACTING SYSTEM CHARACTERISTICS OF HOLOGRAPHIC DISPLAY

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Yong Hwa Kim, Seoul (KR); Byoung Hyo Lee, Seoul (KR); Hyeon Chan Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 19/005,023

(22) Filed: Dec. 30, 2024

(65) Prior Publication Data

US 2026/0169428 A1 Jun. 18, 2026

(30) Foreign Application Priority Data

Dec. 17, 2024 (KR) ........................ 10-2024-0188061

(51) Int. Cl.
*G03H 1/08* (2006.01)

(52) U.S. Cl.
CPC ....... *G03H 1/0808* (2013.01); *G03H 2226/02* (2013.01)

(58) Field of Classification Search
None
See application file for complete search history.

(56) References Cited

U.S. PATENT DOCUMENTS

| | | | | |
|---|---|---|---|---|
| 11,150,605 | B1 * | 10/2021 | Xiao | G03H 1/0808 |
| 11,457,273 | B2 * | 9/2022 | Seo | H04N 21/44008 |
| 11,924,445 | B2 * | 3/2024 | Van Rozendaal | H04N 19/147 |
| 12,167,003 | B2 * | 12/2024 | Dees | H04N 19/172 |
| 2009/0080043 | A1 * | 3/2009 | Minabe | G11B 7/0065 359/29 |
| 2015/0221331 | A1 * | 8/2015 | Onoe | G03H 1/182 369/103 |
| 2017/0286659 | A1 * | 10/2017 | Xiao | G06F 21/32 |

(Continued)

FOREIGN PATENT DOCUMENTS

| | | |
|---|---|---|
| KR | 10-2015-0012697 A | 2/2015 |
| KR | 10-2020-0116715 A | 10/2020 |

OTHER PUBLICATIONS

Machine level translation of KR 20200116715 A.*

(Continued)

*Primary Examiner* — Mohammad J Rahman
(74) *Attorney, Agent, or Firm* — NSIP Law

(57) ABSTRACT

Provided is a method for providing optimized holograms by extracting system characteristics of a holographic display. A hologram providing method according to an embodiment may extract system characteristics of a holographic display by using a hologram that is generated by a holographic display system from a reference image, and a hologram that is numerically reconstructed from the reference image, and may provide holograms generated by reflecting the extracted system characteristics to the holographic display system. Accordingly, realism of holograms may be maximized.

17 Claims, 8 Drawing Sheets

(56) References Cited

U.S. PATENT DOCUMENTS

| | | | | |
|---|---|---|---|---|
| 2019/0036602 | A1* | 1/2019 | Milione | H04J 14/04 |
| 2019/0199718 | A1* | 6/2019 | Nigam | H04L 9/3231 |
| 2019/0332055 | A1* | 10/2019 | Yoon | G03H 1/268 |
| 2020/0142356 | A1* | 5/2020 | Gilles | G03H 1/0808 |
| 2021/0216039 | A1* | 7/2021 | Wenus | G03H 1/0005 |
| 2021/0240135 | A1* | 8/2021 | Gioia | G06F 3/011 |
| 2021/0263468 | A1* | 8/2021 | Gilles | G03H 1/0808 |
| 2022/0206434 | A1* | 6/2022 | Ozcan | G03H 1/0866 |
| 2022/0299939 | A1* | 9/2022 | Moon | G06T 5/80 |
| 2022/0377416 | A1* | 11/2022 | Seo | G06N 3/045 |
| 2023/0019839 | A1* | 1/2023 | Markram | G06N 3/065 |
| 2023/0114385 | A1* | 4/2023 | Ahmed | A61B 90/36<br>600/424 |
| 2023/0305489 | A1* | 9/2023 | Jang | G06T 9/002 |
| 2024/0127465 | A1* | 4/2024 | Madali | G03H 1/0866 |
| 2024/0176292 | A1* | 5/2024 | Boone | G03H 1/0486 |
| 2024/0257676 | A1* | 8/2024 | Matsuda | G03H 1/0005 |
| 2024/0261057 | A1* | 8/2024 | McIntyre | A61B 5/055 |
| 2024/0283954 | A1* | 8/2024 | Dees | G06T 9/002 |
| 2024/0354907 | A1* | 10/2024 | Ozcan | G06N 3/045 |
| 2024/0385099 | A1* | 11/2024 | Prisbey | G03H 1/2645 |
| 2024/0416067 | A1* | 12/2024 | Fox | A61M 21/02 |
| 2025/0378552 | A1* | 12/2025 | Ozcan | G02B 21/367 |

OTHER PUBLICATIONS

Korean Office Action issued on Oct. 10, 2025, in counterpart Korean Patent Application No. 10-2024-0188061 (3 pages in English, 5 pages in Korean).

* cited by examiner

| Field Names | Formats | Detailed Descriptions |
|---|---|---|
| WAVELENGTH_NUMBER | unit8 | Number of hologram representation wavelengths |
| WAVELENGTH | double[] | Hologram representation wavelength (nm) |
| PIXEL_PITCH | double[2] | Sizes of hologram horizontal and vertical pixels (um) |
| PIXEL_NUMBER | unit32[2] | Number of hologram horizontal and vertical pixels |

FIG. 2

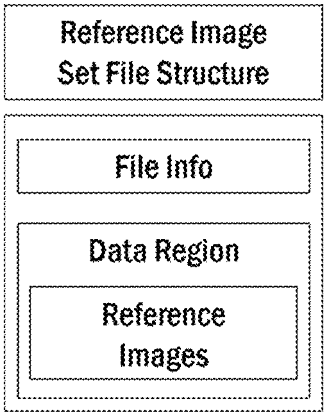

FIG. 4

| Field Names | Formats | Detailed Descriptions |
|---|---|---|
| FILE_SIZE | unit32 | Total capacity of reference image set file |
| DATA_REGION_SIZE | unit32 | Capacity of data region |
| IMAGE_NUMBER | unit32 | Number of stored reference images |
| IMAGE_SIZE | unit32 [] | Size of each reference image (number of bytes) |
| DEPTHMAP_BIT | unit32 | Number of bits of depth map image |
| DEPTHMAP_VALUE | double[] | Distance value of each grayscale of depth map image (mm, defined by the order from 0 to the maximum grayscale defined by DEPTHMAP_BIT |

FIG. 5

| Field Names | Formats | Detailed Descriptions |
| --- | --- | --- |
| FILE_SIZE | unit32 | Total size of transfer hologram set file |
| DATA_SET_NUMBER | unit32 | Number of transfer hologram sets included in data region |
| DATA_SET_SIZE | unit32[] | Data size of each transfer hologram set |
| IMAGE_NUMBER | unit32 | Number of transfer hologram images of each transfer hologram set |
| IMAGE_SIZE | unit32 [] | Data size of transfer hologram images |
| DATA_SET_LABEL_FLAG | bool | Whether transfer hologram set label is provided |
| DATA_SET_LABEL | char [] | (Optional) Transfer hologram set label matrix (4 characters assigned to each set) |

FIG. 8

METHOD FOR PROVIDING OPTIMIZED HOLOGRAMS BY EXTRACTING SYSTEM CHARACTERISTICS OF HOLOGRAPHIC DISPLAY

CROSS-REFERENCE TO RELATED APPLICATION(S) AND CLAIM OF PRIORITY

This application is based on and claims priority under 35 U.S.C. § 119 to Korean Patent Application No. 10-2024-0188061, filed on Dec. 17, 2024, in the Korean Intellectual Property Office, the disclosure of which is herein incorporated by reference in its entirety.

BACKGROUND

Field

The disclosure relates to generating and providing holograms, and more particularly, to a method for generating and providing holograms optimized for system characteristics of a holographic display.

Description of Related Art

Artificial intelligence (AI) technology is utilized in the hologram area. Specifically, a technology that generates holograms by using a deep learning-based hologram generation network and displays the holograms on a holographic display has appeared.

However, in generating holograms, the hologram generation network may not consider system characteristics of the holographic display. To this end, even the holograms that are generated by the same hologram generation network may be displayed differently according to a holographic display.

This means that the holograms generated by the hologram generation network may not be optimized for the holographic display. Accordingly, there is a need for a solution for generating holograms optimized for a holographic display.

SUMMARY

The disclosure has been developed in order to solve the above-described problems, and an object of the disclosure is to provide, as a solution for generating and providing holograms optimized for system characteristics of a holographic display, a method for extracting system characteristics of a holographic display embedded in a hologram generation network of a holographic display system, and generating and providing optimized holograms based on the extracted system characteristics.

To achieve the above-described object, a hologram providing method according to an embodiment of the disclosure may include: receiving, by a hologram providing server, a hologram generated by a holographic display system from a reference image; extracting, by the hologram providing server, system characteristics of a holographic display by using the received hologram and a hologram that is numerically reconstructed from the reference image; and providing, by the hologram providing server, a hologram that is generated by reflecting the extracted system characteristics to the holographic display system.

The received hologram may have the system characteristics of the holographic display reflected thereon. The holographic display system may generate the hologram from the reference image, by using a hologram generation network which is a neural network that learns the system characteristics of the holographic display of the holographic display system.

According to an embodiment of the disclosure, the hologram providing method may further include generating, by the hologram providing server, the reference image based on a system parameter of the holographic display, and transferring the reference image to the holographic display system.

According to an embodiment of the disclosure, the hologram providing method may further include receiving, by the hologram providing server, the system parameter of the holographic display from the holographic display system, and the system parameter may include hologram presentation wavelengths and the number of hologram representation wavelengths, the number of hologram pixels and a size of a hologram pixel, and a depth range.

The hologram that is numerically reconstructed from the reference image may be generated by the holographic display system.

The system characteristics may include optical aberrations, gamma characteristics, and color temperature of the holographic display.

The reference image may include a point light image, a point light array image, a grayscale-modulated monochrome image, and an image in which the aforementioned images are arranged at regular intervals by distance with respect to a depth domain that the holographic display intends to represent.

Providing the hologram may include generating the hologram by using a hologram generation network that is trained to receive an image content and extracted system characteristics and to generate holograms optimized for the system characteristics.

According to another embodiment of the disclosure, a hologram providing system may include: a processor configured to extract system characteristics of a holographic display by using a hologram that is generated by a holographic display system from a reference image and a hologram that is numerically reconstructed from the reference image; and a communication unit configured to provide a hologram that is generated by reflecting the extracted system characteristics to the holographic display system.

According to still another embodiment of the disclosure, a method for extracting system characteristic of a holographic display may include: receiving, by a hologram providing server, a system parameter of the holographic display from a holographic display system; generating, by the hologram providing server, a reference image based on the system parameter of the holographic display, and transferring the reference image to the holographic display system; receiving, by the hologram providing server, a hologram that is generated by the holographic display system from the reference image; and extracting, by the hologram providing server, the system characteristics of the holographic display by using the received hologram and a hologram that is numerically reconstructed from the reference image.

As described above, according to embodiments of the disclosure, system characteristics of the holographic display which are embedded in the hologram generation network of the holographic display system may be extracted, and, based on the system characteristics, holograms that are optimized for the system characteristics of the holographic display may be generated and provided, so that realism may be maximized.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a view illustrating system parameters of the holographic display;

FIG. 4 is a view illustrating a file structure of a reference image set;

FIG. 5 is a view illustrating a file structure of a reference image set;

FIG. 8 is a view illustrating a file structure of a transfer hologram set;

DETAILED DESCRIPTION

Hereinafter, the disclosure will be described in more detail with reference to the accompanying drawings.

Embodiments of the disclosure propose a method for generating and providing optimized holograms by extracting system characteristics of a holographic display. The disclosure relates to a technology that extracts system characteristics of a holographic display embedded in a hologram generation network of a holographic display system, and generates and provides holograms optimized for the system characteristics of the holographic display based on the extracted system characteristics.

Figure 1:
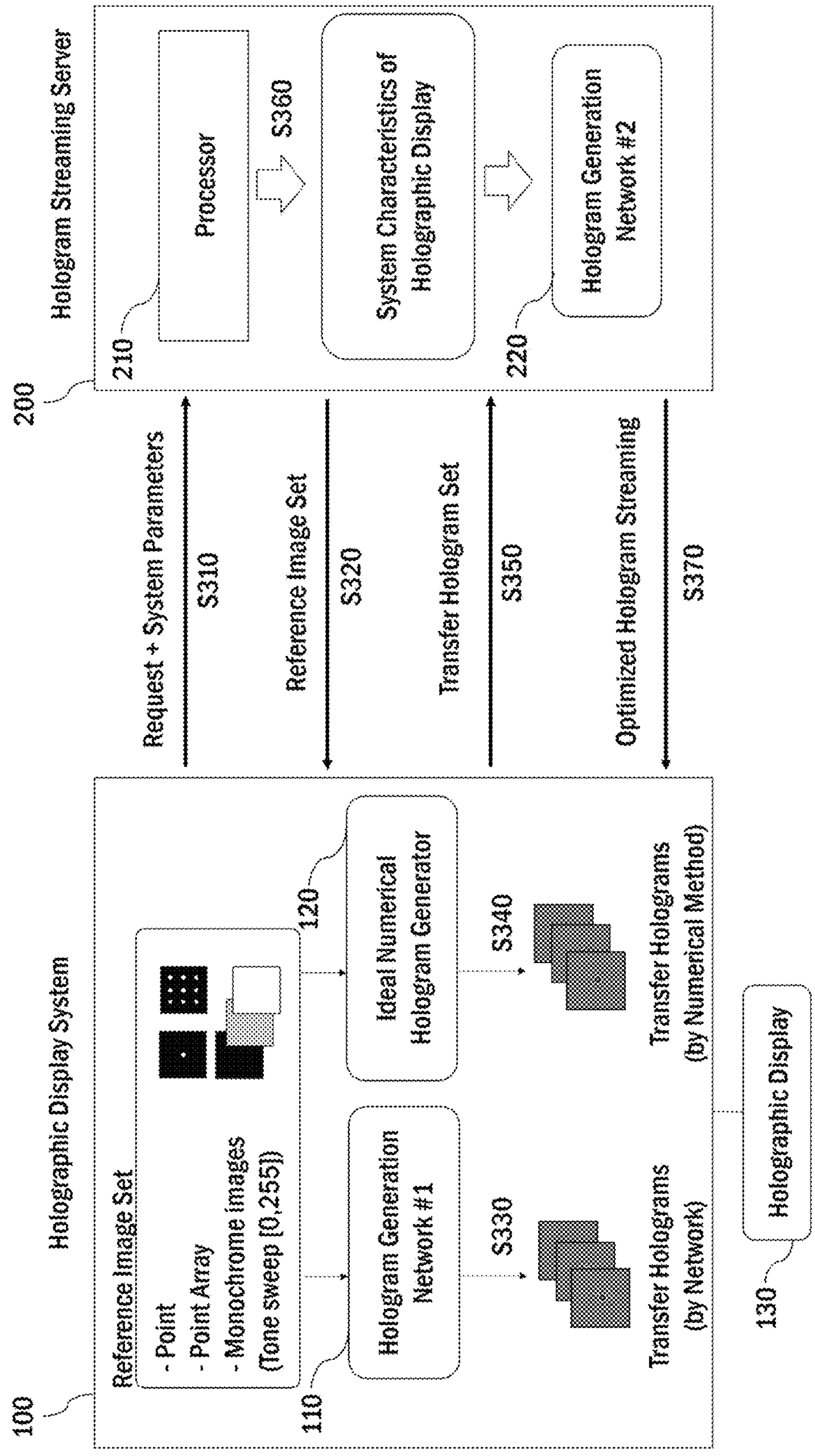
FIG. 1 is a view illustrating a method for providing holograms optimized for a holographic display according to an embodiment of the disclosure.

FIG. 1 is a view illustrating a flow of a method for providing holograms optimized for a holographic display according to an embodiment of the disclosure.

As shown in FIG. 1, a holographic display system 100 may request streaming of optimized holograms, first, while transferring system parameters of its own holographic display 130 to a hologram streaming server 200 (S310).

The system parameters of the holographic display 130, which are transferred at step S310, are listed in the table of FIG. 2. As shown in FIG. 2, the system parameters of the holographic display 130 may include hologram representation wavelengths and the number thereof, the number of hologram pixels and pixel sizes, and may further include a depth range.

Reference is made back to FIG. 1. The hologram streaming server 200 which receives the request at step S310 may generate a reference image set based on the system parameters of the holographic display 130 received with the request, and may transfer the generated reference image set to the holographic display system 100 (S320). The reference image set may be comprised of a plurality of reference images generated to identify system characteristics of the holographic display 130. The reference images will be described in detail below.

The holographic display system 100 may generate holograms from the reference image set by using its own hologram generation network #1 110 (S330), and may generate holograms from the reference image set by using an ideal numerical hologram generator 120 (S340).

Figure 3:
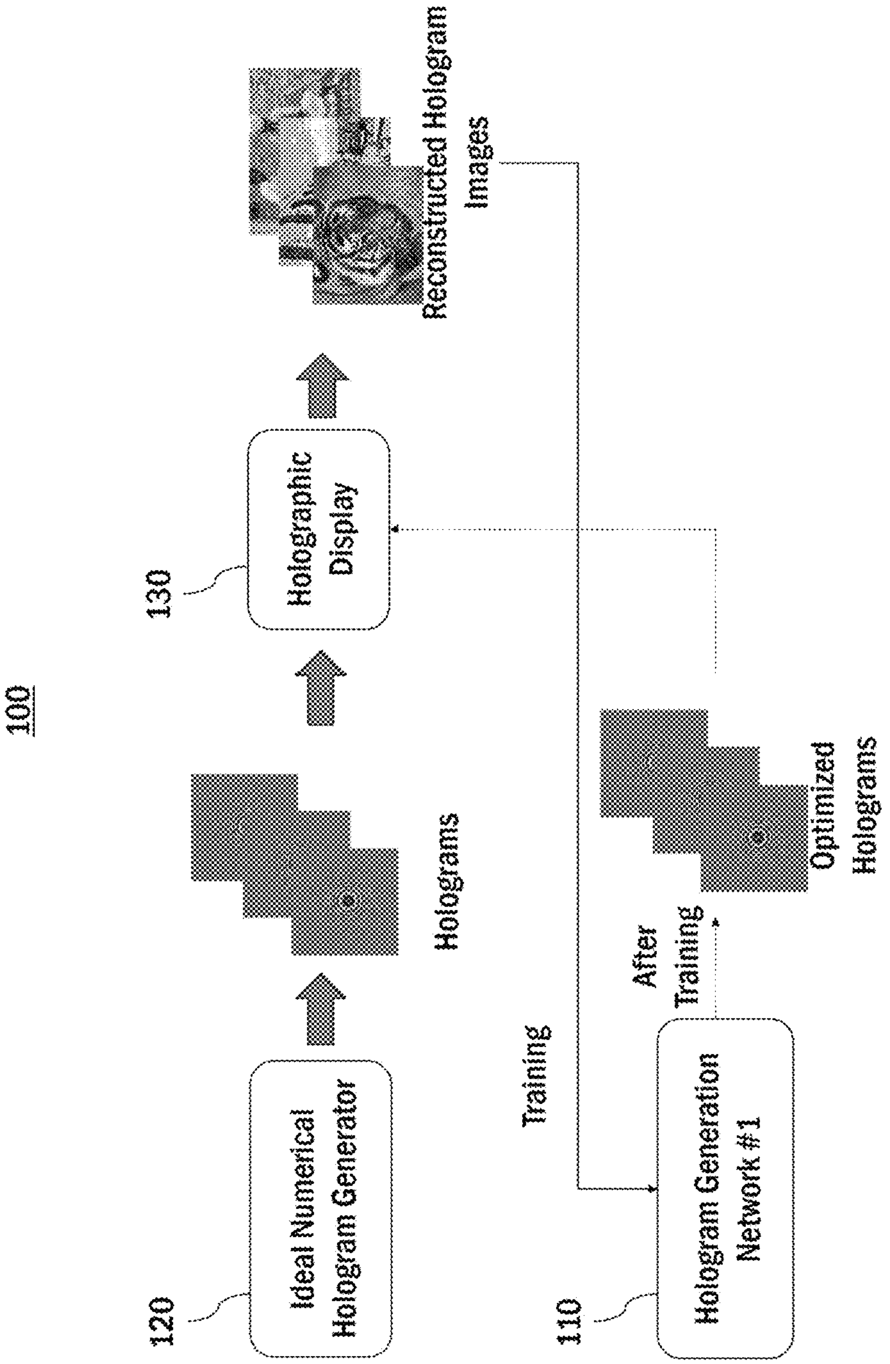
FIG. 3 is a view provided to explain a hologram generation network #1 and an ideal numerical hologram generator of a holographic display system.

The hologram generation network #1 110 and the ideal numerical hologram generator 120 which are configured in the holographic display system 100 will be described in detail below with reference to FIG. 3.

The ideal numerical hologram generator 120 may generate holograms by using a traditional numerical reconstruction method rather than using AI. When holograms generated by the ideal numerical hologram generator 120 are reconstructed as hologram images through the holographic display 130, the holograms may be distorted and noises may be added due to system characteristics of the holographic display 130 (optical aberrations, gamma characteristics, color temperature, etc.).

In order to generate holograms that compensate for the system characteristics of the holographic display 130, the hologram generation network #1 110 may be trained to generate optimized holograms by using the hologram images that are generated by the ideal numerical hologram generator 120 and are reconstructed by the holographic display 130.

However, due to technical, environmental factors, it may be difficult to optimize the holograms generated by the hologram generation network #1 110 for the system characteristics of the holographic display 130 at a high level. In order to optimize the holograms for the system characteristics of the holographic display 130 at a higher level, the system characteristics of the holographic display 130 should be identified and reflected in generating holograms.

The system characteristics of the holographic display 130 may be embedded in the hologram generation network #1 110 through training, but it is practically impossible to identify where and in what form the system characteristics of the holographic display 130 are embedded in the hologram generation network #1 due to characteristics of a deep learning network.

Accordingly, in embodiments of the disclosure, reference images may be used. Specifically, the hologram generation network #1 110 having the system characteristics of the holographic display 130 embedded therein and the ideal numerical hologram generator 120 without the system characteristics are made to generate holograms, respectively, by using the reference images, and the system characteristics of the holographic display 130 may be extracted by comparing the holograms.

By comparing the holograms, it may be determined what change the hologram generation network #1 110 makes to generate holograms that compensate for the system characteristics of the holographic display 130. This is because the holograms generated by the hologram generation network #1 110 have the system characteristics of the holographic display 130 embedded therein, but the holograms generated by the ideal numerical hologram generator 120 do not have the system characteristics of the holographic display 130 embedded therein.

However, in order to accurately extract the system characteristics of the holographic display 130, it is necessary to use appropriate reference images. The reference images may include a point light (point) image, a point light array (point matrix) image, a grayscale-modulated monochrome image, etc., and may further include an image in which the aforementioned images are arranged at regular intervals by distance with respect to a depth domain that the holographic display 130 intends to represent.

A file structure of a reference image set containing reference images is illustrated in FIG. 4. As shown in FIG. 4, the reference image set file may be comprised of a file information region and a data region in which reference images are stored.

The file information region may contain information on the file and information related to the reference images stored in the data region. Specifically, as shown in FIG. 5, the file information region may contain information on a file size, a data region size, the number of reference images, a size of each reference image, the number of bits of a depth map image, and a depth value of each grayscale of the depth map image.

Figure 6:
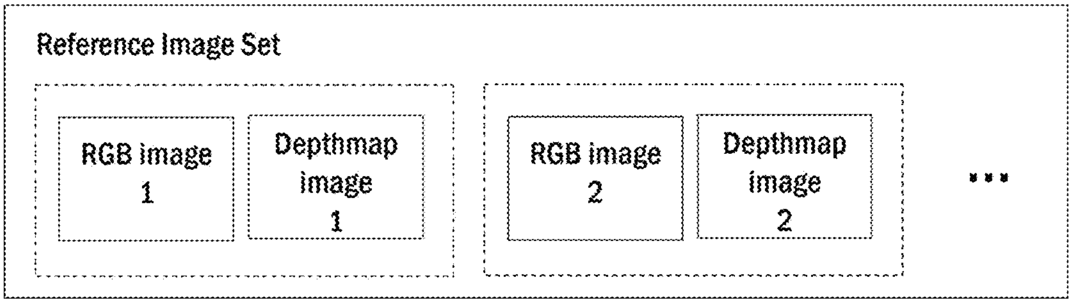
FIG. 6 is a view illustrating a file structure of a reference image set.

In the data region, each reference image may be divided into a color image and a depth map image, and may be stored in sequence as shown in FIG. 6.

Reference is made back to FIG. 1. When the holograms are generated through steps S330 and S340, the holographic display system 100 may constitute a transfer hologram set by unifying the holograms generated at step S330 and the holograms generated at step S340, and may transfer the transfer hologram set to the hologram streaming server 200 (S350).

Figure 7:
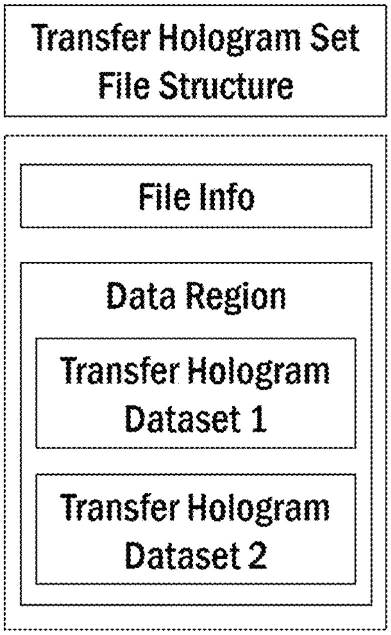
FIG. 7 is a view illustrating a file structure of a transfer hologram set.

The file structure of the transfer hologram set is illustrated in FIG. 7. As shown in FIG. 7, the transfer hologram set file may be comprised of a file information region and a data region in which transfer hologram datasets 1, 2, are stored. The transfer hologram dataset 1 may be the holograms that are generated by the hologram generation network #1 110 at step S330, and the transfer hologram dataset 2 may be the holograms that are generated by the ideal numerical hologram generator 120 at step S340.

The file information region may contain information on the file and information related to the transfer hologram datasets stored in the data region. Specifically, as shown in FIG. 8, the file information region may contain information on a file size, the number of datasets, a size of each dataset, the number of transfer hologram images in each dataset, a size of the transfer hologram image, and information related to labels of the datasets.

Figure 9:
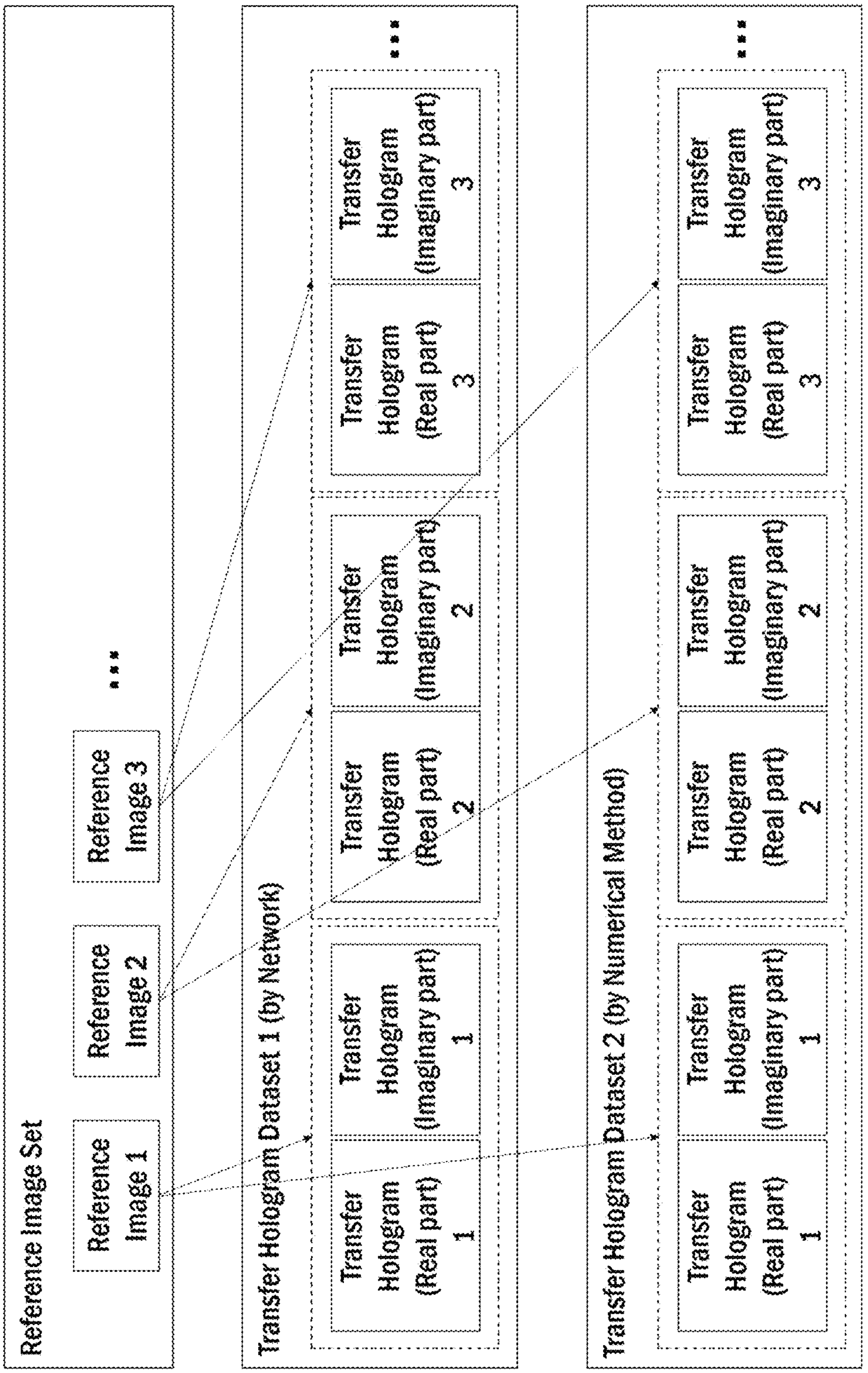
FIG. 9 is a view illustrating a file structure of a transfer hologram set.

As shown in FIG. 9, in the data region, each transfer hologram in each transfer hologram dataset may be divided into a real part and an imaginary part, and may be stored in sequence. In FIG. 9, the reference images based on which the transfer holograms are generated may match each other to indicate that the reference images are not stored in the data region but match and are stored in the same order as the order of the reference images based on which the holograms are generated.

Reference is made back to FIG. 1. A processor 210 of the hologram streaming server 200 which receives the transfer hologram set at step S350 may compare the two types of transfer holograms constituting the transfer hologram set, and may extract the system characteristics of the holographic display 130 (S360). The extracted system characteristics may include optical aberrations, gamma characteristics, color temperature, etc. of the holographic display 130

Figure 10:
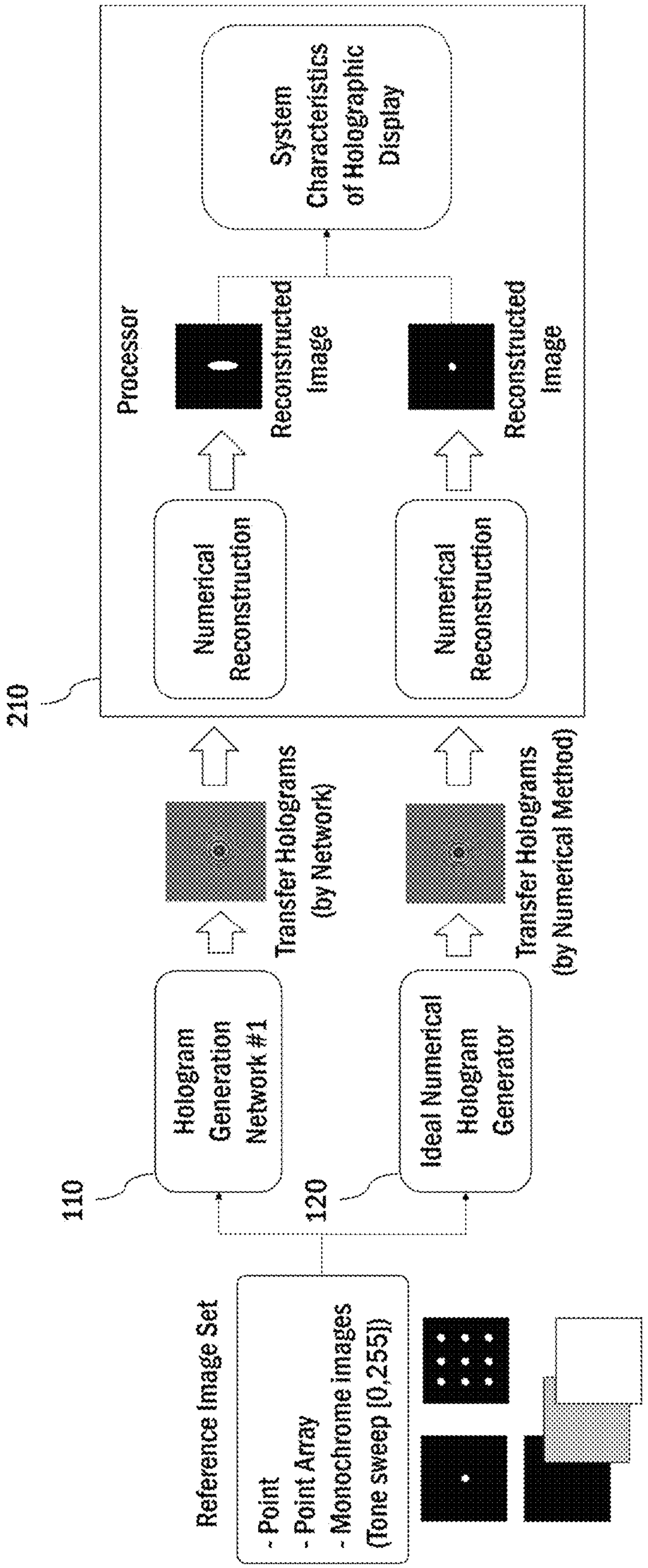
FIG. 10 is a view illustrating a process of extracting system characteristics of a holographic display.

FIG. 10 illustrates an overall process of extracting the system characteristics of the holographic display 130. FIG. 10 illustrates the processes from step S330 to step S360.

As shown in FIG. 10, the processor 210 may reconstruct a hologram image through numerical reconstruction on the transfer holograms generated by the hologram generation network #1 110. The reconstructed hologram image does not reflect the system characteristics of the holographic display 130 and hence is different from the reference image. Specifically, the transfer hologram generated by the hologram generation network #1 110 reflects the system characteristics, but the reconstruction is ideal numerical reconstruction, and therefore, the reconstructed hologram image is a hologram image that inversely compensates for the system characteristics, rather than the reference image.

The processor 210 may reconstruct a hologram image through numerical reconstruction on the transfer holograms generated by the ideal numerical hologram generator 120. The reconstructed hologram image does not reflect the system characteristics of the holographic display 130 and may be the same as the reference image.

When a point light source or an array of point light sources is used as a reference image, the processor 210 may compare forms of a point-spread-function between the two hologram images, and may calculate optical aberrations of the holographic display 130. In particular, fitting in the form of Zernike-polynomial may cause a linear combination of major optical aberrations such as astigmatism, coma, spherical aberrations, and accordingly, it is possible for the processor 210 to numerically analyze respective optical aberration components based on the linear combination.

When monochrome images are used as a reference image set and reference images that use monochrome images for various grayscale values are used, the processor 210 may extract gamma characteristics and color temperature by pixel of the holographic display 130 by comparing the two hologram images.

Reference is made back to FIG. 1. When the system characteristics are extracted at step S360, a hologram generation network #2 of the hologram streaming server 200 may generate optimized holograms reflecting the system characteristics of the holographic display 130, and may stream the optimized holograms to the holographic display system 100 (S370).

The holograms generated at step S370 may be holograms to be streamed to the holographic display system 100, and may be generated from an image content to be serviced, rather than the reference image set.

The hologram generation network #2 220 may be a deep learning network that is trained to receive an image content and system characteristics of the holographic display 130 and to generate holograms optimized for the system characteristics. That is, the hologram generation network #2 220 may differ from the hologram generation network #1 110 of the holographic display system 100 in terms of the hologram generation method.

Up to now, the method for providing the optimized holograms by extracting the system characteristics of the holographic display has been described in detail with reference to preferred embodiments.

In the above-described embodiments, the system characteristics of the holographic display which are embedded in the hologram generation network of the holographic display system may be extracted, and, based on the system characteristics, holograms optimized for the system characteristics of the holographic display may be generated and provided, so that realism may be maximized.

In the above-described embodiments, the ideal numerical hologram generator 120 of the holographic display system 100 generates transfer holograms from the reference image set. However, this is merely an example and is changeable. For example, an ideal numerical hologram generator may be provided in the hologram streaming server 200 to allow the hologram streaming server 200 to generate transfer holograms from the reference image set. In this case, the hologram streaming server 200 does not have to receive the transfer holograms generated by the ideal numerical hologram generator 120.

Although not shown, the hologram streaming server 200 may be provided with a communication means to receive the request, the system parameters, and the transfer hologram sets from the holographic display system 100, and to stream the reference image set and the optimized hologram to the hologram streaming server 200.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A hologram providing method comprising:

receiving, by a hologram providing server, a first hologram generated by a holographic display system from a reference image using a first hologram generation neural network that is trained to learn system characteristics of a holographic display of the holographic display system, and a second hologram that is numerically reconstructed from the reference image by an ideal numerical hologram generator of the holographic display system without the system characteristics of the holographic display being reflected thereon;

extracting, by the hologram providing server, system characteristics of a holographic display by comparing the first hologram and the second hologram; and providing, by the hologram providing server, an optimized hologram generated by a second hologram generation neural network of the holographic display server that is trained to receive an image content and the extracted system characteristics as inputs and to generate the optimized hologram specific to the holographic display, the second hologram generation neural network being different from the first hologram generation neural network of the holographic display system.

2. The hologram providing method of claim 1, wherein the first hologram has the system characteristics of the holographic display reflected thereon.

3. The hologram providing method of claim 2, wherein the holographic display system is configured to generate the first hologram from the reference image, by using the first hologram generation neural network, wherein the first hologram generation neural network is a neural network that is trained using hologram images reconstructed through the holographic display to learns the system characteristics of the holographic display of the holographic display system.

4. The hologram providing method of claim 1, further comprising generating, by the hologram providing server, the reference image based on a system parameter of the holographic display, and transferring the reference image to the holographic display system.

5. The hologram providing method of claim 4, further comprising receiving, by the hologram providing server, the system parameter of the holographic display from the holographic display system, wherein the system parameter comprises hologram presentation wavelengths and the number of hologram representation wavelengths, the number of hologram pixels and a size of a hologram pixel, and a depth range.

6. The hologram providing method of claim 1, wherein the second hologram that is numerically reconstructed from the reference image is generated by the holographic display system.

7. The hologram providing method of claim 1, wherein the system characteristics comprise optical aberrations, gamma characteristics, and color temperature of the holographic display.

8. The hologram providing method of claim 7, wherein the reference image comprises a point light image, a point light array image, a grayscale-modulated monochrome image, and an image in which the aforementioned images are arranged at regular intervals by distance with respect to a depth domain that the holographic display intends to represent.

9. The hologram providing method of claim 1, wherein the providing the optimized hologram comprises generating the second hologram by using the second hologram generation neural network that is trained to receive the image content and extracted system characteristics and to generate holograms optimized for the system characteristics.

10. A hologram providing system comprising:

a processor configured to:

extract system characteristics of a holographic display by comparing a first hologram that is generated by a holographic display system from a reference image using a first hologram generation neural network that is trained to learn the system characteristics of the holographic display and a second hologram that is numerically reconstructed from the reference image by an ideal numerical hologram generator of the holographic display system without the system characteristics of the holographic display being reflected thereon; and provide an optimized hologram generated by a second hologram generation neural network of the holographic display server that is trained to receive image content and the extracted system characteristics as inputs and to generate the optimized hologram specific to the holographic display, the second hologram generation neural network being different from the first hologram generation neural network of the holographic display system.

11. A method for extracting system characteristic of a holographic display, the method comprising:

receiving, by a hologram providing server, a system parameter of the holographic display from a holographic display system;

generating, by the hologram providing server, a reference image based on the system parameter of the holographic display, and transferring the reference image to the holographic display system;

receiving, by the hologram providing server, a first hologram that is generated by the holographic display system from the reference image using a first hologram generation neural network that is trained to learn the system characteristics of the holographic display, and a second hologram that is numerically reconstructed from the reference image by an ideal numerical hologram generator of the holographic display system without the system characteristics of the holographic display being reflected thereon; and extracting, by the hologram providing server, the system characteristics of the holographic display by comparing the received first hologram with the received second hologram.

12. The hologram providing method of claim 1, wherein the providing the hologram comprises streaming, by the hologram providing server, the optimized hologram to the holographic display system by using the second hologram generation neural network that receives both the image content and the extracted system characteristics.

13. The hologram providing system of claim 10, wherein the holographic display system is configured to generate the first hologram from the reference image, by using the first hologram generation neural network, wherein the first hologram generation neural network is a neural network that is trained using hologram images reconstructed through the holographic display to learns the system characteristics of the holographic display of the holographic display system.

14. The hologram providing system of claim 10, wherein the processor is configured to generate, by the hologram providing server, the reference image based on a system parameter of the holographic display, and transferring the reference image to the holographic display system.

15. The hologram providing system of claim 14, wherein the processor is configured to receive, by the hologram providing server, the system parameter of the holographic display from the holographic display system, wherein the system parameter comprises hologram presentation wavelengths and the number of hologram representation wavelengths, the number of hologram pixels and a size of a hologram pixel, and a depth range.

16. The hologram providing system of claim 10, wherein the system characteristics comprise optical aberrations, gamma characteristics, and color temperature of the holographic display.

17. The hologram providing system of claim 16, wherein the reference image comprises a point light image, a point light array image, a grayscale-modulated monochrome image, and an image in which the aforementioned images are arranged at regular intervals by distance with respect to a depth domain that the holographic display intends to represent.

* * * * *